UNITED STATES PATENT OFFICE.

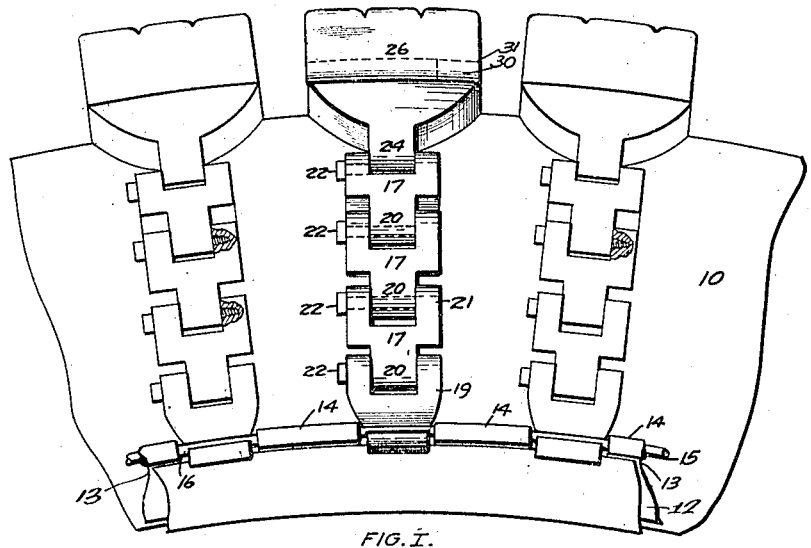
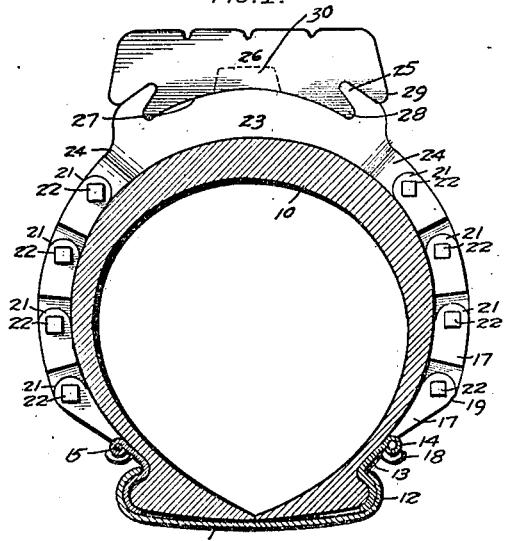

PETER L. HARVEY, OF DES MOINES, IOWA.

TIRE-PROTECTOR.

1,285,994.

Specification of Letters Patent.

Patented Nov. 26, 1918.

Application filed July 26, 1915. Serial No. 42,088.

*To all whom it may concern:*

Be it known that I, PETER L. HARVEY, a citizen of the United States, and resident of Des Moines, in the county of Polk and State of Iowa, have invented a certain new and useful Tire-Protector, of which the following is a specification.

The object of my invention is to provide a tire protector of simple, durable and inexpensive construction.

A further object is to provide a tire protector made in units so constructed and arranged and mounted on the tire that any of the units may be quickly and easily disassembled for the purpose of replacing or repairing any of the elements of the particular unit.

Still a further object is to provide such a device made in units so constructed and arranged that each unit may be mounted on the tire independently of the other unit without interfering with or being dependent thereon.

A further object is to provide such a protector which may serve the purpose of an anti-skidding device.

Still a further object is to provide such a protector so constructed and arranged and provided with such parts as to make the device substantially noiseless when in use.

My invention consists in the construction, arrangement and combination of the various parts of the device whereby the objects contemplated are attained as hereinafter more fully set forth, pointed out in my claim and illustrated in the accompanying drawings, in which:

Figure 1 shows a side elevation of a portion of a tire equipped with a protector embodying my invention, and Fig. 2 shows a vertical sectional view through the tire showing one of the protector units in front elevation.

In the accompanying drawings, I have used the reference numeral 10 to indicate generally the casing of an ordinary pneumatic tire, of the clencher type, mounted on the rim 11. My protector comprises a plurality of units. The method of mounting the same on the tire will now be described.

I provide an annular member adapted to be placed on each side of the rim and having a curved portion 12 arranged to fit on the inside of the curved portion of the rim, and a member 13 inclined outwardly from the center of the wheel and also laterally, as shown in Fig. 1.

Formed on the outer edge of the portion 13 is a plurality of spaced bearing members 14. Suitably mounted in the bearing members 14 is a rod or heavy wire 15. Between the bearings 14 are successive notches 16 formed in the portion 13 of the annular members. Each unit of my improved protector comprises on each side a link having a body portion 17, and at its inner end a curved hook member 18 adapted to be placed over and to receive the wire or rod 15.

The outer end of the link 17 is provided with a pair of spaced outwardly extending bearings 19, which register with each other. Each unit has a plurality of links, each comprising a body portion 17 similar to that already described, and a central inwardly extending bearing 20, and a pair of spaced outwardly extending bearings 21, the openings in which register with each other.

The inner bearing 20 of one link is placed between the bearings 19 and a bolt 22 is extended through one bearing 19 and screwed into the other bearing 19.

The inner bearing member 20 of each of the other links is inserted between the bearings 21 of the next inner adjacent link, and is pivotally connected thereto by means of a similar bolt 22 extended through one of the bearings 21 and screwed into the other bearing 21.

The central tread portion of each unit of my improved tire protector comprises a body portion 23 having a curved or concave lower face to fit the tire and a substantially parallel upper face. At each end the body 23 is provided with a laterally extending lug 24, having an opening through it. The lug 24 is designed to be extended between the bearings 21 of the outer link of the series on each side of the tire, as shown in the figures, and to be secured thereto by a bolt 22.

Near each side of the body 23 on opposite sides of the central tread portion of the device is a lug 25 inclined outwardly from the center of the wheel and also toward a vertical plane extended through the center of the wheel and the circumference of the tire from the center of the wheel.

I have provided cushioning members 26 of rubber or the like having concave inner faces 27 to fit the convex outer faces of the body 23, and having a laterally inclined lug 28 designed to be received in the spaces between the lugs 25 and the body 23, and with laterally and inwardly inclined lugs 29 designed to fit above and against the outer surfaces of the lugs 25, as shown in Fig. 1.

The bodies 23 are provided at one end with an outwardly extending lug 30, indicated by dotted lines in the figures, and the cushioning members 26 are provided with notches 31 adapted to receive the lugs 30.

In the assembling and installation of my improved tire protector, the annular members 12 are placed in position on each side of the wheel, and the rods or wires 15 are placed in the bearings 14. The units may then be assembled by securing together the links, and by securing the links to the body 23. One of the links, however, designed to be secured to the wire or rod 15, should be left separate from the rest of the unit. The end link at one side of the unit is then placed in position by sliding the link member 18 around the wire 15 and the unit of the protector is placed on the tire. The separate link is then assembled on the wire 15 on the opposite side of the wheel and connected with the proper link on the same side by means of a bolt 22. The cushioning member 26 is then slid into position on the member 23 circumferentially of the wheel.

The member 26 is preferably so made that its lugs 28 have to be spread somewhat, to assemble the parts, so that their resiliency will, by friction, hold the cushion member 26 in position. The cushioning member 26, however, is held against sliding in one direction circumferentially of the wheel, by a lug 30. It may be mentioned in this connection that the lug 30 is so located that the rotation of the wheel through the forward travel of the machine tends to force the member 26 against said lug 30.

The units are preferably placed close enough together so that the cushioning member 26 cannot travel longitudinally of the wheel a sufficient distance with relation to the members 23 to which they are secured to be detached therefrom on account of the next adjacent units of the protector.

It will be seen that any unit may be quickly and easily removed from the wheel by the removal of one bolt 22, and that any link may be quickly and easily taken out and repaired or replaced with a new link.

By removing one bolt 22, the unit of which it forms a part may be swung clear of the wheel, except at one end of the unit, and the member 26 may then be slidably removed for purposes of repair or replacement.

The parts of my device are of simple and inexpensive construction, and may be made in standard sizes, so that they may be quickly interchanged.

It may be mentioned in this connection that the members 12 and 15 may be in various sizes for different sized tires, while the rest of the units may be built up to fit any tire by the addition of the links, and it is thus possible for the dealer to carry a comparatively small stock by keeping on hand extra links, and at the same time to be able to fit any tire that customers may have.

Changes may be made in the construction and arrangement of the parts of my improved device without departing from its essential features and purposes, and it is my intention to cover by this application any such changes which may be included within the scope of my claim.

I claim as my invention.

A tire protector comprising a plurality of tire protecting units, a plurality of detachable members designed to be slidably mounted on said units by a movement circumferentially of the tire, flexible devices connected with each of said first named units designed to extend sidewise around the tire, means for securing the inner ends of said flexible devices at the felly of a wheel in position spaced circumferentially of the wheel, so that said second described members cannot slide longitudinally of the tire for becoming free from the respective first described members without coming in contact with adjacent tire protecting members.

Des Moines, Iowa, July 15, 1915.

PETER L. HARVEY.

Witnesses:
C. C. SCHWINGER,
F. E. CAMPBELL.